United States Patent
Tseng et al.

(10) Patent No.: US 11,372,388 B2
(45) Date of Patent: Jun. 28, 2022

(54) LOCKING ERROR ALARM DEVICE AND METHOD

(71) Applicants: FOXCONN PRECISION ELECTRONICS (TAIYUAN) CO., LTD., Taiyuan (CN); HON HAI PRECISION INDUSTRY CO., LTD., New Taipei (TW)

(72) Inventors: Wen-Shou Tseng, New Taipei (TW); Juan Zhang, Taiyuan (CN); Lu Han, Taiyuan (CN); Zi-Wei Gao, Taiyuan (CN)

(73) Assignees: FOXCONN PRECISION ELECTRONICS (TAIYUAN) CO., LTD., Taiyuan (CN); HON HAI PRECISION INDUSTRY CO., LTD., New Taipei (TW)

( * ) Notice: Subject to any disclaimer, the term of this patent is extended or adjusted under 35 U.S.C. 154(b) by 247 days.

(21) Appl. No.: 16/658,492

(22) Filed: Oct. 21, 2019

(65) Prior Publication Data
US 2020/0241494 A1    Jul. 30, 2020

(30) Foreign Application Priority Data
Jan. 25, 2019 (CN) .......................... 201910077319.7

(51) Int. Cl.
G05B 19/042 (2006.01)
B23P 19/06 (2006.01)
G05B 19/04 (2006.01)

(52) U.S. Cl.
CPC ........ *G05B 19/0423* (2013.01); *B23P 19/066* (2013.01); *G05B 19/041* (2013.01); *G05B 2219/23399* (2013.01); *G05B 2219/24024* (2013.01)

(58) Field of Classification Search
None
See application file for complete search history.

(56) References Cited

U.S. PATENT DOCUMENTS

| | | | | |
|---|---|---|---|---|
| 5,549,169 A * | 8/1996 | Matsumura | ............. | B23P 19/06 173/176 |
| 5,631,823 A * | 5/1997 | Layer | ....................... | B21J 15/28 700/50 |
| 6,473,703 B1 * | 10/2002 | Kurtzberg | ........ | G05B 19/41865 702/84 |
| 10,197,977 B2 * | 2/2019 | Salsbury | ................... | F24F 11/30 |
| 2003/0109951 A1 * | 6/2003 | Hsiung | ............. | G05B 19/4093 700/108 |

(Continued)

*Primary Examiner* — Jason D Mitchell
(74) *Attorney, Agent, or Firm* — ScienBiziP, P.C.

(57) ABSTRACT

A method of alarm of a screw-locking error includes retrieving a confidence interval of screw-locking parameter data of different screw specifications, setting locking parameter data of a screw-locking process according to a range of the confidence intervals, acquiring locking parameter data in real time, collating the acquired locking parameter data, analyzing the collated locking parameter data to obtain normal locking parameter data and abnormal locking parameter data, and analyzing the abnormal locking parameter data to obtain an error type of each abnormal locking parameter data. The abnormal locking parameter data and the corresponding error type of the abnormal locking parameter data are reported.

12 Claims, 6 Drawing Sheets

(56) References Cited

U.S. PATENT DOCUMENTS

| | | | | |
|---|---|---|---|---|
| 2004/0068382 A1* | 4/2004 | Schindler | ............... | B25B 23/14 |
| | | | | 702/33 |
| 2008/0027678 A1* | 1/2008 | Miller | ............... | G05B 23/0297 |
| | | | | 702/182 |
| 2008/0082295 A1* | 4/2008 | Kant | ................. | G05B 23/024 |
| | | | | 702/179 |
| 2008/0082304 A1* | 4/2008 | Miller | ................. | G05B 17/02 |
| | | | | 703/9 |
| 2013/0067711 A1* | 3/2013 | Harada | ................ | B25J 9/1679 |
| | | | | 29/407.01 |
| 2013/0068491 A1* | 3/2013 | Kusakawa | ............ | B25B 21/00 |
| | | | | 173/176 |
| 2014/0022075 A1* | 1/2014 | Price | ................. | G08B 27/005 |
| | | | | 340/540 |
| 2015/0338162 A1* | 11/2015 | Hoffman | ............... | F26B 17/20 |
| | | | | 34/429 |
| 2019/0355111 A1* | 11/2019 | Keene | ................ | G06T 7/0004 |
| 2020/0130152 A1* | 4/2020 | Parlow | ................ | B25B 21/00 |
| 2020/0282499 A1* | 9/2020 | Wang | ................ | B23P 19/066 |

* cited by examiner

LOCKING ERROR ALARM DEVICE AND METHOD

FIELD

The subject matter herein generally relates to power supplies, and more particularly to a power supply for an electronic device.

BACKGROUND

An industrial automatic screw-locking device generally adopts a combination of programmable logic controller (PLC) control and manual detection or adopts a combination of computer control and manual detection to complete automatic screw-locking procedures on an assembly line. The various hardware systems and command systems of the locking method are closed, incompatible with each other, and have poor versatility. Therefore, a locking status of the screws and optimization of screw-locking procedures are desired.

BRIEF DESCRIPTION OF THE DRAWINGS

Implementations of the present disclosure will now be described, by way of embodiments, with reference to the attached figures.

DETAILED DESCRIPTION

Figure 1:
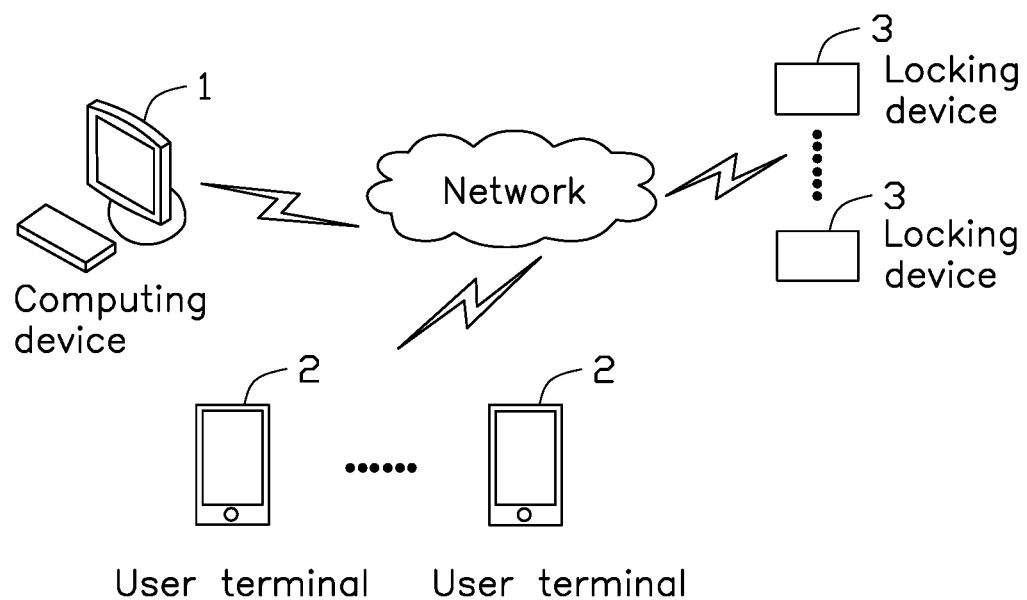
FIG. 1 is a schematic diagram of an implementation environment of a method of alarm for a screw-locking error.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 shows a schematic diagram of an implementation environment of a method of alarm for a screw-locking error.

The method of alarm for a screw-locking error is applied in a computing device 1, which establishes communication with at least one user terminal 2 and at least one locking device 3 through a network. The network may be a wired network or a wireless network, such as radio, Wireless Fidelity (WIFI), cellular, satellite, broadcast, and the like.

The computing device 1 may be an electronic device, such as a personal computer, a server, or the like, in which a screw-locking error alarm software is installed, wherein the server may be a single server, a server cluster, a cloud server, or the like.

The user terminal 2 may be an electronic device including but not limited to, a smart phone, a tablet computer, a laptop portable computer, a desktop computer, and the like having a display screen.

The locking device 3 is a machine or machine cluster with a screw-locking function.

Figure 2:
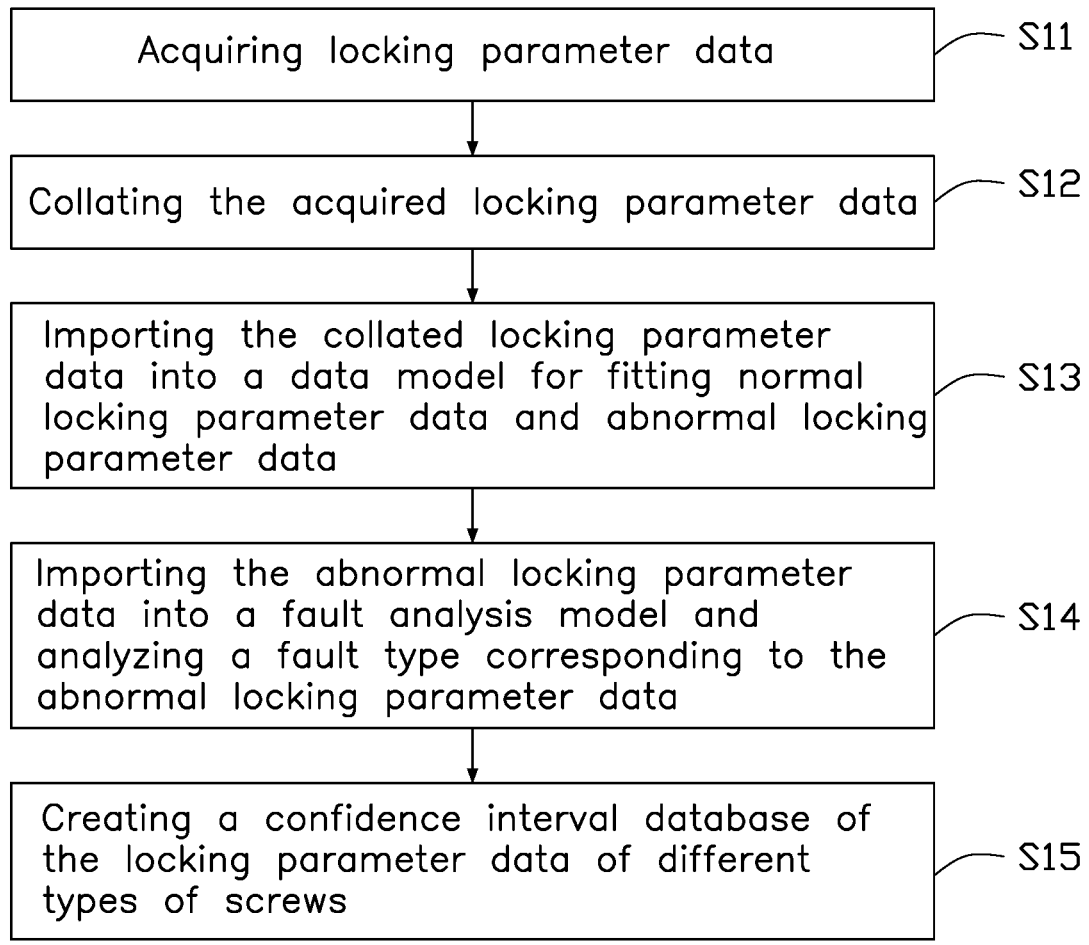
FIG. 2 is a flowchart of a method for generating a confidence interval database of a screw-locking error alarm method.

Referring to FIG. 2, a flowchart of a method for generating a confidence interval database of a screw-locking error alarm method for setting locking parameter data during a screw-locking process is disclosed herein. The order of the blocks in the flowchart may be changed according to different requirements, and some steps may be omitted.

In block S11, locking parameter data is acquired.

Figure 3:
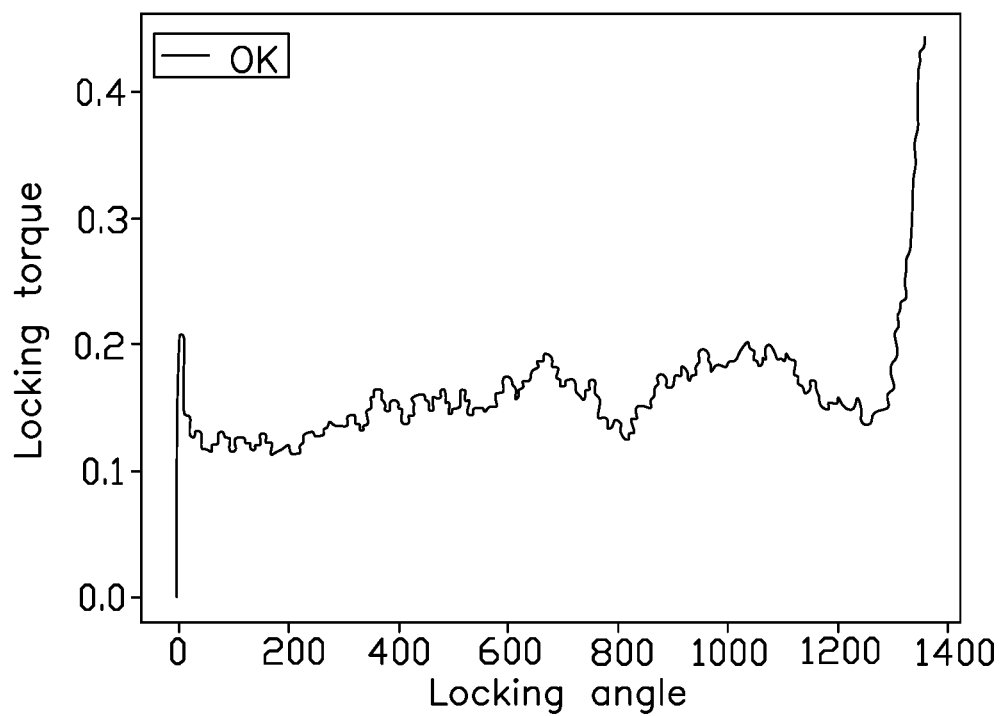
FIG. 3 is a graph showing a relationship between a locking torque and a locking angle.

The locking parameter data is remotely acquired by using an application programming interface (API), and the locking parameter data includes a locking angle of the lock screw, a locking torque, and a locking speed, wherein the locking angle has a corresponding relationship with the locking torque as shown in FIG. 3, and the locking angle has a corresponding relationship with the locking speed (not shown). The relationship between the locking angle and the locking torque and the relationship between the locking angle and the locking speed are defined by the screw specifications.

In one embodiment, the API interface is used in Python to remotely acquire the locking parameter data of the locking device. Python is a computer programming language known in the art.

In another embodiment, an intelligent platform management interface (ipmi) command is used in Java to remotely acquire the locking parameter data of the locking device. Java is a computer programming language known in the art.

In block S12, the acquired locking parameter data is collated.

In one embodiment, the locking parameter data is collated by pre-processing and statistical feature processing.

The locking parameter data is pre-processed according to the following steps:

1) The locking angle is divided, and the locking angle is segmented.

Specifically, a method of time series segmentation processing is to divide the locking angle according to a time series using a sliding window SW algorithm, and collect the collected continuous locking angles according to time segmentation segments. In one embodiment, for a time series of any one locking process, given a minimum value N and a maximum value M of the window length, a fitting error of each point is calculated starting from a first point of the sequence and connecting with the Nth point. If the fitting error is less than a given threshold R, the fit is successful. The window length is further increased, and then the fitting error is calculated again. If the fitting error is less than R, the window length is continued to be increased until the window length is M. When the fitting error is greater than R, the first segment ends and is set as a first segment of the lock-screw time. Taking the M point as a new window starting point, the above-described process is continued until the sequence is divided and a segment set of the locking angle of the entire locking screw process is obtained. The threshold R is set according to locking process requirements of different screws.

2) A two-dimensional graph is drawn according to the corresponding relationship between the existing locking angle and the locking torque, and a two-dimensional graph is drawn according to the corresponding relationship between the existing locking angle and the locking speed.

The two-dimensional graphs are drawn with the locking angle as the abscissa and the locking torque and the locking speed as the ordinates. The two-dimensional curve is composed of a number of sets of segments of different lengths according to the time segments of the locking angle and the locking torque and the locking speed.

3) The set of segments with different locking angles are extended and shortened to calculate a similarity between the two time series.

A dynamic time warping algorithm is used to extend and shorten the segment set of the locking angle and the locking torque and the segment set of the locking angle and the locking speed to calculate the similarity between the segment sets.

4) Data in the same segment set are cluster-analyzed.

A K-means mean algorithm is used to perform cluster analysis on the data in each segment set of the locking angle and the locking torque to remove redundant data and retain key data. A K-means mean algorithm is used to perform cluster analysis on the data in each segment set of the locking angle and the locking speed to remove redundant data and retain key data.

5) The same data in the same interval are merged.

A time-series folding line processing method is used to connect the locking angle processed by the K-means mean value algorithm with the same data in the same interval of the locking torque curve, and a connection having a same trend is deleted. The locking angle processed by the K-means mean algorithm is connected with the same data in the same interval of the locking speed curve, and the connection having a same trend is deleted. Thus, the data is simplified and integrated.

The pre-processed locking parameter data includes segment data having a trend interval. The statistical feature processing includes processing the segment data using a statistical method to obtain a feature vector having statistical features.

Block S13, the collated locking parameter data is imported into a data model for fitting normal locking parameter data and abnormal locking parameter data.

In one embodiment, the data model is a Gaussian regression model, and the collated locking angle, locking torque, and locking speed are imported into the Gaussian regression model. A center and standard deviation of a Gaussian mixture model is determined according to a three-dimensional Gaussian distribution map. The coordinate value and standard deviation of the center of the Gaussian mixture model are determined by the Gaussian distribution map. Data falling within the standard deviation range of the coordinate value of the center of the Gaussian mixture model is the normal locking parameter data, and data falling outside of the standard deviation range is the abnormal locking parameter data. A normal locking state refers to a screw completely screwed into a screw hole and cannot be further screwed in. The normal locking parameter data refers to the locking angle, the locking torque, and the locking speed set in the locking device 1 in the normal locking state. An abnormal locking state refers to a screw not fully screwed in, slanted, slipped, or offset during a course of screwing into a screw hole. The abnormal locking parameter data refers to the locking angle, the locking torque, and the locking speed set in the locking device 1 in the abnormal locking state.

In another embodiment, the data model is a logistic regression model. A Sigmoid function is selected as a discriminant function, and the locking parameter data is continuously input to train the function parameters in a fastest gradient direction to obtain the logistic regression model of optimal parameters. Substituting the locking parameter data into the trained logistic regression model can determine whether the locking parameter data is normal.

The training process of the Gaussian regression model three-dimensional Gaussian distribution map and the parameter training process of the logistic regression model can be completed offline.

At block S14, the abnormal locking parameter data obtained by the data model analysis is imported into an error analysis model, and an error type corresponding to the abnormal locking parameter data is analyzed.

The error analysis model includes a multiple multiple regression model, a decision tree based classification model, a margin optimization based SVM classification model, and a neural network based combined classification model.

In one embodiment, the error analysis model is a multiple multiple regression model, and the multiple multiple regression equation forms are as follows:

$$Y = \beta_0 X_0 + \beta_1 X_1 + \beta_2 X_2 + \cdots + \beta_n X_n + \varepsilon$$

$X_0 \ldots X_n$ is physical parameter information of the screw and abnormal locking parameter data. The physical parameter information of the screw includes one or more parameters of a cap diameter, a cap thickness, a rod diameter, and a rod length. The abnormal locking parameter data includes the locking angle, the locking torque, and the locking speed. Y is the lock error type, such as unlocked, not fully locked, slipped, and offset. The lock error type can be represented by digital quantization; $\beta_0 \ldots \beta_n$ is the regression coefficient of the regression equation, and E is the random error.

A training method of the regression coefficient of the multiple multiple regression equation is as follows. The locking parameter data of the existing abnormal locking parameter data and the error type corresponding to the abnormal locking parameter data are selected, and the parameters of the model are fitted. The physical parameter information of the screw, the abnormal locking parameter data, and the quantified lock error type are imported into the multiple multiple regression equation, and the coefficients and random errors of the multiple multiple regression equation are obtained by fitting. The method of fitting the coefficients of the multiple multiple regression equations can be done offline.

The abnormal locking parameter data and the physical parameter information of different types of screws can be substituted into the fitted multiple multiple regression equation to obtain the error type corresponding to the abnormal locking parameter data of different types of screws.

In other embodiments, physical parameter information and abnormal locking parameter data of different types of screws may also be substituted into a decision tree based classification model, a margin optimization based SVM classification model, and a neural network based combined classification model to fit the faults that occur during a locking process of different types of screws.

In some embodiments, a result of the error analysis can be further improved by integrating the learning algorithm. Integrated learning refers to improving the effect of machine learning by combining several of the above-mentioned models.

In block S15, a confidence interval database of the locking parameter data of different types of screws is created by a method of statistical sampling extraction.

A confidence interval of a sample is determined according to the locking parameter data corresponding to the error type (the locking parameter data can be obtained from block S14), and the physical parameters of the different types of screws are determined by statistical sampling. The confidence interval is the locking parameter data of different screws during a locking process.

In one embodiment, the method for extracting statistical samples is a Bootstrap method, and the locking parameter data of different types of screws can be extracted by using the locking parameter data corresponding to the error type obtained in block S14 and the physical parameter information of different screws. The Bootstrap method uses a known empirical distribution function and obtains the Bootstrap distribution of statistics through non-parametric methods, semi-parametric methods, and parametric re-sampling techniques. Based on this, statistical inference can be made to calculate the confidence interval of the locking parameter data for different types of screws, thereby establishing a database containing confidence intervals for the locking parameter data of different types of screws. The process of creating the confidence level database can be done offline.

Figure 4:
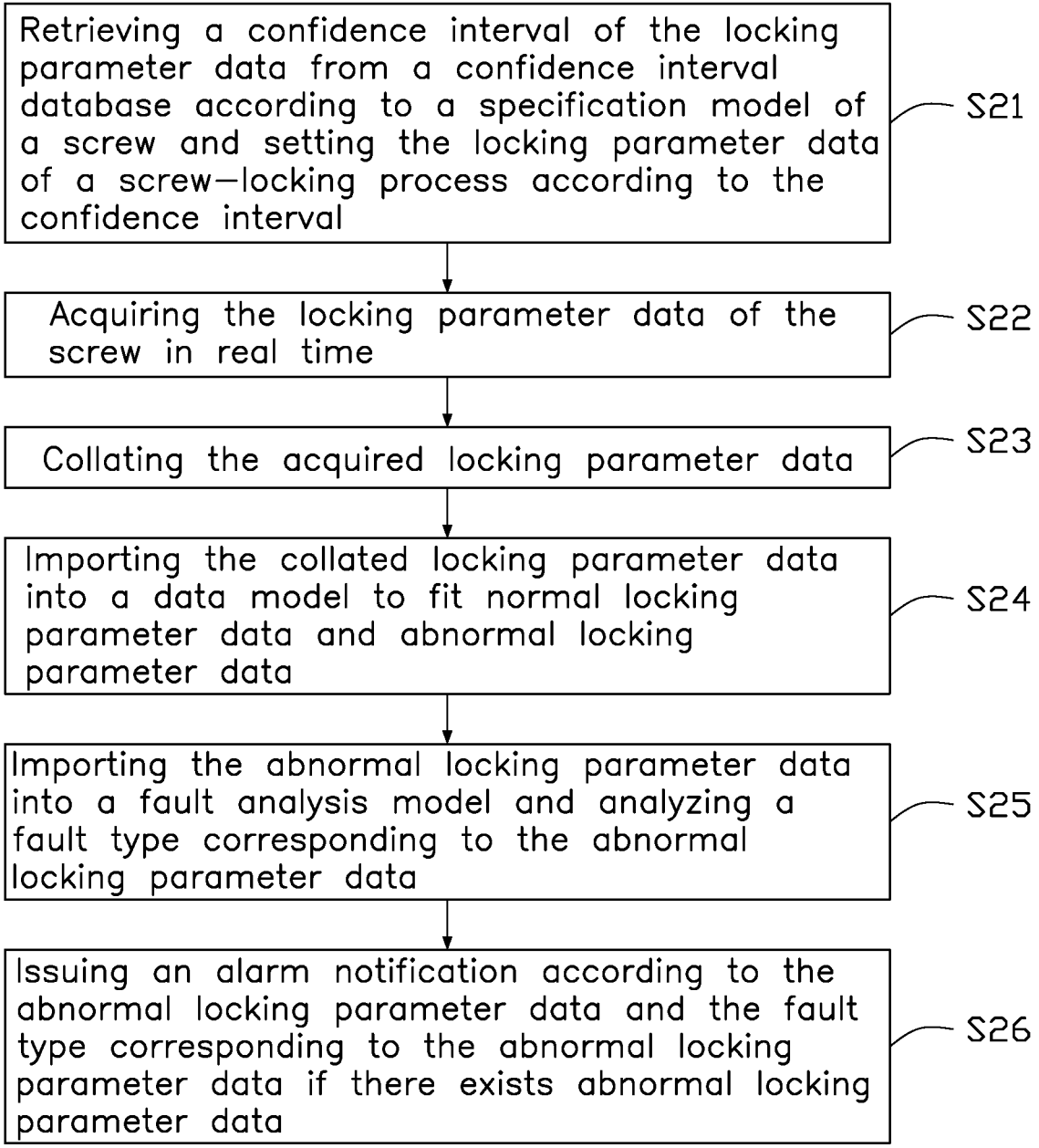
FIG. 4 is a flowchart of a method of alarm of a screw-locking error.

FIG. 4 is a flowchart of a method of alarm of a screw-locking error.

At block S21, the confidence interval of the locking parameter data is retrieved from the confidence interval database according to the specification model of the screw, and the locking parameter data of the screw-locking process is set according to the confidence interval range. A method of creating the confidence interval database may be completed according to blocks S11-S15.

At block S22, the locking parameter data of the screw is acquired in real time.

The locking parameter data may be acquired from a remote device as described in block S11. The locking parameter data includes the locking angle, the locking torque, and the locking speed. The locking angle has a corresponding relationship with the locking torque, and the locking angle has a corresponding relationship with the locking speed.

At block S23, the acquired locking parameter data is collated.

The locking parameter data may be collated as described in block S12. The data collation includes data pre-processing and statistical feature processing. The pre-processing includes using a time-series segmentation method to divide the locking angle according to a time series using a sliding window SW algorithm and segmenting the locking angle according to the relationship between the existing locking angle and the locking torque and the relationship between the existing locking angle and the locking speed, drawing a two-dimensional graph of the locking angle and the locking torque, drawing a two-dimensional graph of the locking angle and the locking speed, and using a dynamic time warping algorithm to extend and shorten the segment sets with different locking angles to calculate the similarity between the two time series. The K-means mean algorithm is used to cluster the data in the same segment set. Finally, the time series is used. A polyline processing method combines the same data in the same interval to achieve compact integration of the locking parameter data. The pre-processed locking parameter data is segment data having a trend interval. The segment data is processed using a mathematical method of waveform mean, variance, extremum, and waveband to obtain a statistical feature as a feature vector.

At block S24, the collated locking parameter data is imported into a data model to fit the normal locking parameter data and the abnormal locking parameter data as described in block S13.

At block S25, the abnormal locking parameter data obtained by the data model is imported into an error analysis model, and an error type corresponding to the abnormal locking parameter data is analyzed as described in block S14.

At block S26, if there exists abnormal locking parameter data, an alarm notification is issued according to the abnormal locking parameter data and the error type corresponding to the abnormal locking parameter data.

In one embodiment, the alert notification is sent to the at least one user terminal 2.

The alert notification may be in the form of at least one of an email notification, a telephone notification, a text message notification, and a social network platform notification.

Figure 5:
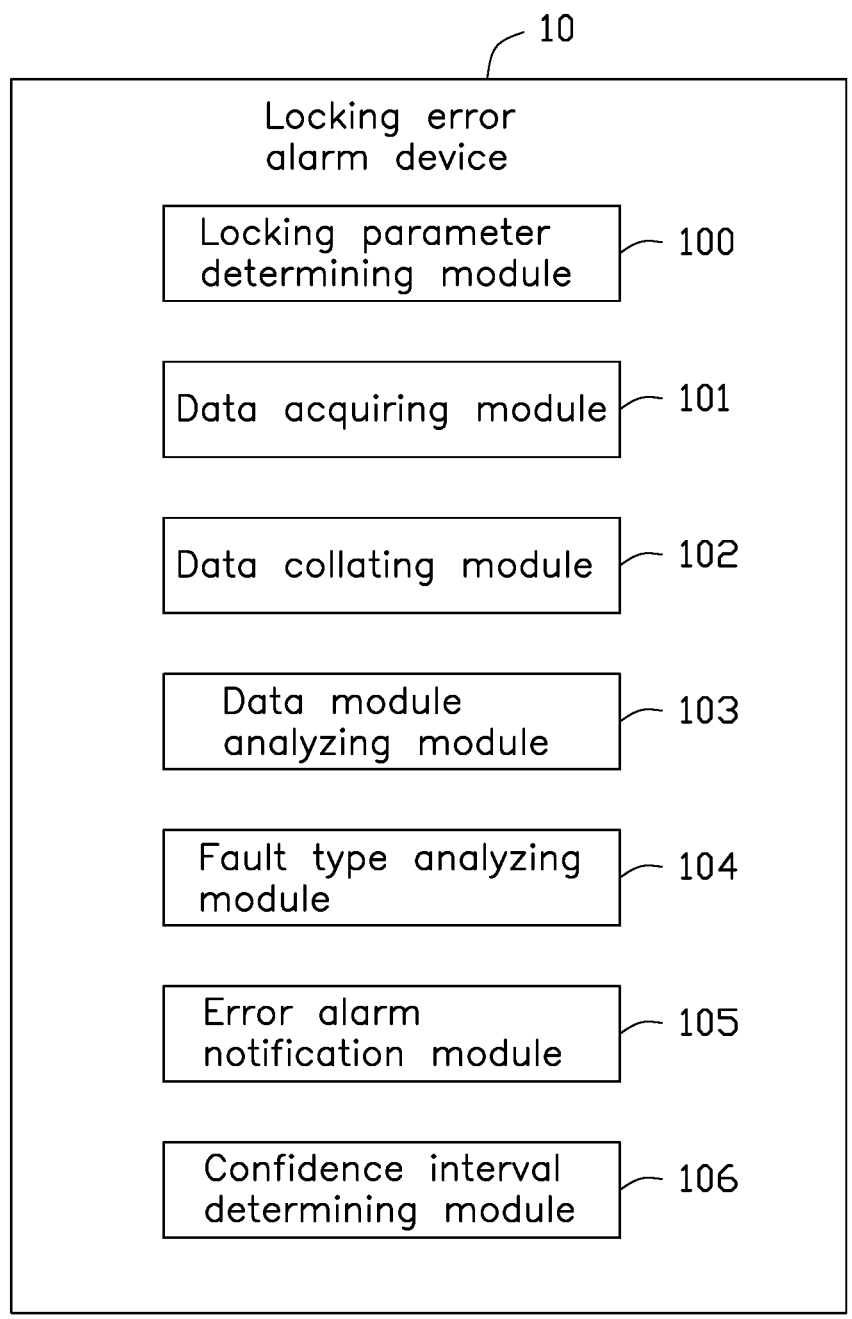
FIG. 5 is a block diagram of modules of a locking error alarm device.

FIG. 5 shows an embodiment of function modules of a locking error alarm device. The locking error alarm device 10 may operate in the computing device 1. The computing device 1 is in communication with a plurality of user terminals 2 through a network. The locking error alarm device 10 can include a plurality of function modules consisting of program code segments. The program code of each of the modules in the locking error alarm device 10 may be stored in a memory of the computing device 1 and executed by at least one processor.

The function modules of the locking error alarm device 10 may include a locking parameter determining module 100, a data acquiring module 101, a data collating module 102, a data model analyzing module 103, an error type analyzing module 104, an error alarm notification module 105, and a confidence interval determining module 106. A module as referred to in the present invention refers to a series of computer program segments that can be executed by at least one processor and that are capable of performing fixed functions, which are stored in a memory. In one embodiment, the functions of the respective modules will be described in detail in the subsequent embodiments.

The locking parameter determining module 100 is configured to retrieve a confidence interval of the screw parameter information of different specifications from the confidence interval database and set the locking parameter data of the screw-locking process in the locking device 3 according to the confidence interval range.

The data acquiring module 101 is configured to remotely acquire the locking parameter data using an application programming interface (API). The locking parameter data includes a locking angle, a locking torque, and a locking speed.

In one embodiment, the API is used in Python to remotely acquire the locking parameter data in the locking device 3.

In another embodiment, an ipmi command is used in Java to remotely acquire the locking parameter data in the locking device 3.

The data collating module 102 is configured to perform the data pre-processing and statistical feature processing on the collated locking parameter information.

The data model analyzing module 103 is configured to analyze the collated data to fit the normal locking parameter data and the abnormal locking parameter data.

The data model analyzing module 103 is further configured to import the collated data into the data model for analysis. The data model includes any one of a multiple logistic regression model and a Gaussian regression model.

The error alarm notification module 105 is configured to issue an alarm notification according to the abnormal locking parameter data and the error type corresponding to the abnormal locking parameter data. The alert notification may be sent to the at least one user terminal 2.

The confidence interval determining module 106 is configured to generate the confidence interval database.

Figure 6:
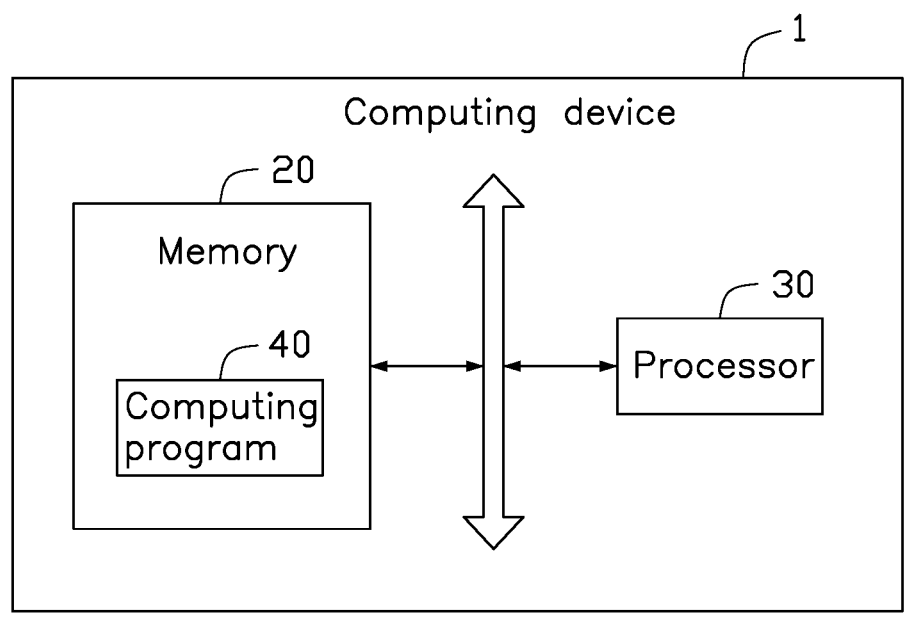
FIG. 6 is a block diagram of a computing device.

FIG. 6 shows an embodiment of a computing device 1. The computing device 1 includes a memory 20, a processor 30, and a computer program 40 stored in the memory 20 and executed by the processor 30. The computer program 40 may contain the function modules as described in FIG. 5.

The computing device 1 may be a desktop computer, a notebook, a palmtop computer, or a cloud server. It will be understood by those skilled in the art that the schematic diagram is merely an example of the computing device 1, and does not constitute a limitation of the computing device 1, and may include more or less components than those illustrated, or some components may be combined, or different. Components, such as the computing device 1 may also include input and output devices, network access devices, buses, and the like.

The processor 30 may be a central processing unit (CPU), or may be other general-purpose processors, a digital signal processor (DSP), an application specific integrated circuit (ASIC), Field-Programmable Gate Array (FPGA) or other programmable logic device, discrete gate or transistor logic device, discrete hardware components, etc. The general purpose processor may be a microprocessor or the processor 30 may be any conventional processor or the like, and the processor 30 is a control center of the computing device 1.

The memory 20 can be used to store the computer program 40 and/or modules/units by running or executing computer programs and/or modules/units stored in the memory 20, and by calling in memory. Data within the memory 20 implements various functions of the computing device 1. The memory 20 may mainly include a storage program area and a storage data area, wherein the storage program area may store an operating system, an application required for at least one function (such as a sound playing function, an image playing function, etc.), and the like; the storage data area may be data (such as audio data, phone book data, etc.) created according to the use of the computing device 1. In addition, the memory 20 may include a high-speed random access memory, and may also include a non-volatile memory such as a hard disk, a memory, a plug-in hard disk, a smart memory card (SMC), a secure digital (SD) card, flash card, at least one disk storage device, flash device, or other volatile solid state storage device.

The modules/units integrated by the computing device 1 can be stored in a computer readable storage medium if implemented in the form of a software functional unit and sold or used as a stand-alone product. Based on such understanding, all or part of the processes in the above-described embodiments are implemented and may also be implemented by a computer program to instruct related hardware. The computer program may be stored in a computer readable storage medium. The blocks of the various method embodiments described above may be implemented by a computer program when executed by a processor. The computer program includes computer program code, which may be in the form of source code, object code form, executable file or some intermediate form. The computer readable medium may include any entity or device capable of carrying the computer program code, a recording medium, a USB flash drive, a removable hard disk, a magnetic disk, an optical disk, a computer memory, a read-only memory (ROM), a random access memory (RAM, Random Access Memory), electrical carrier signals, telecommunications signals, and software distribution media. It should be noted that the content contained in the computer readable medium may be appropriately increased or decreased according to the requirements of legislation and patent practice in a jurisdiction, for example, in some jurisdictions, according to legislation and patent practice, computer readable media does not include electrical carrier signals and telecommunication signals.

In the several embodiments described above, it should be understood that the disclosed computer apparatus and method may be implemented in other manners. For example, the computing device embodiments described above are merely illustrative. For example, the division of the unit is only a logical function division, and the actual implementation may have another division manner.

In addition, each functional unit in each embodiment may be integrated in the same processing unit, each unit may exist physically separately, or two or more units may be integrated in the same unit. The above integrated unit can be implemented in the form of hardware or in the form of hardware plus software function modules.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A method of alarm of a screw-locking error, the method comprising:

retrieving a confidence interval of screw-locking parameter data of different screw specifications, and setting locking parameter data of a screw-locking process according to a range of the confidence intervals, wherein the locking parameter data comprises a locking angle, a locking torque, and a locking speed of the locking screw, the locking angle has a relationship with the locking torque, the locking angle has a relationship with the locking speed;

acquiring locking parameter data in real time;

collating acquired locking parameter data by pre-processing and statistical feature processing, the pre-processing comprising dividing the locking angle and segment processing the locking angle, drawing a two-dimensional graph according to the corresponding relationship between the existing locking angle and the locking torque, drawing a two-dimensional graph according to the corresponding relationship between the existing locking angle and the locking speed, extending and shortening different sets of segments of the locking angle to calculate a similarity between two time series, cluster analyzing data within the same set of segments, and merging the same data within a same interval, the pre-processed locking parameter data comprising segment data with a trend interval, the statistical feature processing comprising processing the segment data using a statistical method to obtain a feature vector with statistical features;

analyzing collated locking parameter data to obtain normal locking parameter data and abnormal locking parameter data, and analyzing the abnormal locking parameter data to obtain an error type of each abnormal locking parameter data; and reporting the abnormal locking parameter data and the corresponding error type of the abnormal locking parameter data.

2. The method of claim 1, wherein the locking parameter data is acquired by an application programming interface remotely acquiring the locking parameter data.

3. The method of claim 1, wherein:
the relationship between the locking angle and the locking torque and the relationship between the locking angle and the locking speed are defined by the screw specifications.

4. The method of claim 1, wherein:
the collated locking parameter data is analyzed by importing the collated locking parameter data into a data model for analysis and fitting the normal locking parameter data and the abnormal locking parameter data; and
the data model comprises at least one of a multiple logistic regression model and a Gaussian regression model.

5. The method of claim 1, wherein:
the collated locking parameter data is analyzed by importing the abnormal locking parameter data into an error analysis model;
the error analysis model comprises at least one of a multiple multiple regression model, a decision tree based classification model, a margin optimization based SVM classification model, and a neural network based combined classification model.

6. The method of claim 1, wherein the locking parameter data of the screw-locking process is set by retrieving a confidence interval of screw-locking parameter data of different screw specifications from a confidence interval database, the confidence interval database generated by:
acquiring the locking parameter data;
collating the acquired locking parameter data;
importing the collated locking parameter data into a data model to fit the normal locking parameter data and the abnormal locking parameter data;
importing the abnormal locking parameter data into an error analysis model and analyzing an error type corresponding to the abnormal locking parameter data; and
creating a confidence interval database with confidence intervals for the locking parameter data of different types of screws, wherein the confidence interval is the locking parameter data of different screw specifications during the locking process.

7. A computing device comprising:
a processor; and
a memory storing a plurality of instructions, which when executed by the processor, cause the processor to:
retrieve a confidence interval of screw-locking parameter data of different screw specifications, and set locking parameter data of a screw-locking process according to a range of the confidence intervals, wherein the locking parameter data comprises a locking angle, a locking torque, and a locking speed of the locking screw, the locking angle has a relationship with the locking torque, the locking angle has a relationship with the locking speed;
acquire locking parameter data in real time;
collate the acquired locking parameter data by pre-processing and statistical feature processing, the pre-processing comprising dividing the locking angle and segment processing the locking angle, drawing a two-dimensional graph according to the corresponding relationship between the existing locking angle and the locking torque, drawing a two-dimensional graph according to the corresponding relationship between the existing locking angle and the locking speed, extending and shortening different sets of segments of the locking angle to calculate a similarity between two time series, cluster analyzing data within the same set of segments, and merging the same data within a same interval, the pre-processed locking parameter data comprising segment data with a trend interval, the statistical feature processing comprising processing the segment data using a statistical method to obtain a feature vector with statistical features;
analyze the collated locking parameter data to obtain normal locking parameter data and abnormal locking parameter data, and analyze the abnormal locking parameter data to obtain an error type of each abnormal locking parameter data; and
report the abnormal locking parameter data and the corresponding error type of the abnormal locking parameter data.

8. The computing device of claim 7, wherein the locking parameter data is acquired by an application programming interface remotely acquiring the locking parameter data.

9. The computing device of claim 7, wherein:
the relationship between the locking angle and the locking torque and the relationship between the locking angle and the locking speed are defined by the screw specifications.

10. The computing device of claim 7, wherein:
the collated locking parameter data is analyzed by importing the collated locking parameter data into a data model for analysis and fitting the normal locking parameter data and the abnormal locking parameter data; and
the data model comprises at least one of a multiple logistic regression model and a Gaussian regression model.

11. The computing device of claim 7, wherein:
the collated locking parameter data is analyzed by importing the abnormal locking parameter data into an error analysis model;
the error analysis model comprises at least one of a multiple multiple regression model, a decision tree based classification model, a margin optimization based SVM classification model, and a neural network based combined classification model.

12. The computing device of claim 7, wherein the locking parameter data of the screw-locking process is set by retrieving a confidence interval of screw-locking parameter data of different screw specifications from a confidence interval database, the confidence interval database generated by:
    acquiring the locking parameter data;
    collating the acquired locking parameter data;
    importing the collated locking parameter data into a data model to fit the normal locking parameter data and the abnormal locking parameter data;
    importing the abnormal locking parameter data into an error analysis model and analyzing an error type corresponding to the abnormal locking parameter data; and
    creating a confidence interval database with confidence intervals for the locking parameter data of different types of screws, wherein the confidence interval is the locking parameter data of different screw specifications during the locking process.

* * * * *